US008209657B1

(12) United States Patent
Sawyer et al.

(10) Patent No.: US 8,209,657 B1
(45) Date of Patent: Jun. 26, 2012

(54) SYSTEM DESIGN COMBINING FUNCTIONAL DECOMPOSITION AND OBJECT-ORIENTED PROGRAMMING

(75) Inventors: George A. Sawyer, Nashua, NH (US); Don L. Carrara, Weare, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1551 days.

(21) Appl. No.: 11/657,952

(22) Filed: Jan. 25, 2007

Related U.S. Application Data

(60) Provisional application No. 60/789,210, filed on Apr. 3, 2006.

(51) Int. Cl.
*G06F 9/44* (2006.01)
(52) U.S. Cl. ........ 717/100; 717/103; 717/106; 717/108; 717/121
(58) Field of Classification Search ........................ None
See application file for complete search history.

(56) References Cited

U.S. PATENT DOCUMENTS

| | | | | |
|---|---|---|---|---|
| 5,461,714 A | * | 10/1995 | Honiden et al. | 704/258 |
| 5,734,907 A | * | 3/1998 | Jarossay et al. | 717/141 |
| 6,327,551 B1 | * | 12/2001 | Peterson et al. | 703/1 |
| 2001/0007976 A1 | * | 7/2001 | Thompson et al. | 705/7 |
| 2001/0037412 A1 | * | 11/2001 | Miloushev et al. | 709/315 |
| 2004/0268219 A1 | * | 12/2004 | Brown et al. | 715/500 |
| 2005/0027870 A1 | * | 2/2005 | Trebes, Jr. | 709/227 |
| 2005/0197875 A1 | * | 9/2005 | Kauffman | 705/7 |
| 2006/0015839 A1 | * | 1/2006 | Owens et al. | 717/100 |

OTHER PUBLICATIONS

Yves Vanderperren et al., "SysML and Systems Engineering Applied to UML-Based SoC Design", 2005, EE Department, pp. 1-8.*

* cited by examiner

*Primary Examiner* — Isaac Tecklu
(74) *Attorney, Agent, or Firm* — Daniel J. Long; Robert K. Tendler

(57) ABSTRACT

An architecture for designing complex systems includes combining functional decomposition and object-oriented techniques at each level along with specifying links between the levels as well as links between the objects at a level to promote understanding of the system under development and assist both the system design engineers and the hardware and software engineers to develop the system.

19 Claims, 9 Drawing Sheets

SYSTEM DESIGN COMBINING FUNCTIONAL DECOMPOSITION AND OBJECT-ORIENTED PROGRAMMING

RELATED APPLICATIONS

This application claims rights under 35 USC §119(e) from U.S. Provisional Application Ser. No. 60/789,210 filed Apr. 3, 2006, the contents of which are incorporated herein by reference.

STATEMENT OF GOVERNMENT INTEREST

This invention was made with United States Government support under Contract No. M4422 with the Joint Strike Fighter Program. The United States Government has certain rights in this invention.

FIELD OF THE INVENTION

This invention relates to a method of generating a specification for a complex project and more particularly to the use of combined object-oriented programming and functional decomposition techniques to provide a consistent design methodology for architecting complex systems.

BACKGROUND OF THE INVENTION

Currently there are challenges associated with efficiently and effectively developing larger and more complex products and systems for a wide variety of applications. More specifically, there is a need for a development methodology that would provide a standard for system design and specification throughout engineering teams including external organizations; allow for appropriate level of detail needed for defining a large complex system; and improve communications between engineering disciplines, particularly between systems engineers and software engineers.

Collective experience and research shows that there are a large number of existing alternatives for notations, development approaches and CASE tools available to support the development of large and complex systems. However, the available methods and tools only loosely imply a development approach instead of actually defining one.

Heretofore, in system design, functional decomposition was utilized to take a series of tasks and to provide a hierarchical structure so that the tasks could be broken down for further engineering. The problem in such a functional decomposition strategy is that if one has 4,000-5,000 tasks to do, one cannot easily manage the breakup of the system into an appropriate hierarchy.

Standard functional decomposition is a breakdown from the top level down to each individual lower level of the entire system design. Typically, one starts out with a system as one box and decomposes it into boxes that communicate with each other at lower and lower levels until one finally gets down to where decomposition is no longer useful. By taking the output of the decomposition, one can design those small components that have been decomposed.

If one wanted to use object-oriented techniques for complex system design, they would not be well adapted to a hierarchical structure since the object-oriented techniques all have the objects at the same level. Thus, object-oriented techniques were not generally utilized in complex system architecture or design.

The reason that object-oriented techniques do not operate at different levels is because there is a basic assumption in object-oriented programming which maintains that all objects have to communicate with each other. When they do, they must communicate with each other on the same level.

Object-oriented techniques are useful for very simplified system engineering and design tasks. But as the number of objects increases there is of necessity a need for objects to communicate with objects at various levels in a hierarchy. This is because it is the hierarchy that allows one to break down the tasks in a meaningful fashion. It is noted that many systems engineers who use a standard functional decomposition approach do so by generating PowerPoint presentations or utilize standard circuit design tools, all of which imply a hierarchical structure.

For functional decomposition, one writes down a document specification or other listing in which each element or each requirement that the system is expected to do is reflected in text. One then takes a look at these requirements and decomposes them into hardware and software requirements, at which point one hands off the hardware and software the requirements to hardware and software engineers to instruct them to build the system in accordance with those requirements.

The problem with such an approach is poor communication between the systems engineers and the electrical engineers, mechanical engineers and software engineers. In short, functional decomposition does not impose an overlying architecture that can guide the engineers.

The result of a lack of communication or the lack of each engineer knowing where his task lies within the hierarchy can result in glaring omissions. For instance, in designing a firefighting system in which one looks for forest fires and seeks to put them out, if one forgets to take into account that dropping water on an individual may cause injury or death and that the location of the individual must be accurately known when, for instance, a tanker drops flame retardant over a given area, then the omission is critical.

In complex systems it is highly desirable to minimize the omission type mistakes or misunderstandings that can flow from a pure functional decomposition approach to system design.

SUMMARY OF INVENTION

Rather than utilizing functional decomposition to architect a system, in the subject invention, object-oriented programming is combined with functional decomposition techniques to create a functional object design, FOD, architecture, so that the object-oriented programming can be used in the design process to operate over the many hierarchical levels necessary for complex projects.

What is done in the subject system is to apply object-oriented analysis and design techniques at each individual level of the hierarchical composition. The composition to each level is done utilizing standard techniques in which one applies, in a certain order, what things are to be accomplished and what the methodology is.

In one embodiment the methodology incorporates an iterative multi-step process where one actually looks at the objects one wants to create, looks at the environment that they are going to operate in, and looks to how the objects communicate with each other.

The first step, which is only conducted at the start of a project, is referred to as "Step 0." This is the step in which initial information about the potential system or solution is collected including: Objectives, Features, Needs, Capabilities, Requirements, Constraints, Interfaces, Applicable Standards, Operating Environments, Deficiencies and Shortfalls for Existing Systems. There is the added inducement that this collection of pertinent information is a typical and responsible first step no matter what development process, approach or methodology one is using.

The subject functional object design proceeds as an iterative, top-down system development methodology that heavily applies object-oriented techniques at each level of decomposition. In addition to a couple of precursor steps, the subject system repeats many of the following steps at each level of system development as listed below, which specifies object and sub-object creation.

Objects and Sub-objects
1. Identify object context and interfaces
2. Define object capabilities and constraints
3. Establish traceability between the object requirements and its capabilities and constraints
4. Develop a realization of the object by decomposing it into sub-objects
5. Assign capabilities and constraints to the new sub-objects
6. Decide which sub-objects to decompose further
7. Repeat steps 1 through 6 for each sub-object which requires further decomposition in which the sub-object now becomes the new object
8. Use discipline-specific methods to implement sub-objects that do not need further decomposition Note that Step 1 is where one looks at the context of the system and identifies everything that is external to the system and where it is to interface with the system.

Step 2 is where the designer looks at the capabilities of the system, meaning that one looks at the functionality or functional requirements and non-functional requirements of the system, otherwise known as constraints. Thus in Step 2 one looks at constraints.

Step 3 is where one asks if one is going to decompose a system and if one is going to decompose it, and to which objects is one going to decompose it.

Step 4 is where one performs the decomposition itself and identifies the system objects at the various levels.

Step 5 is where one maps the capabilities that are identified in Step 2, meaning mapping them to the next-level objects.

After one is done the mapping and in accordance with Step 6, one establishes whether or not any further decomposition is necessary. If so, then in Step 7 one drops down for further decomposition.

Note that at Level 0 there is only one object, which is the overall goal of the system, at which point one decomposes this goal into lower objects. One then looks at the lower level to establish whether or not the situation is still complex. If still complex, then one is obliged to do another round of decomposition and generate associated objects utilizing object-oriented analysis and design techniques for the next level of objects.

Thus, the subject functional object design system provides hierarchy and decomposition, with objects populating each level. Note, for each level one creates objects utilizing the use case diagrams, sequence diagrams, state transition diagrams, activity diagrams and a class diagram, with all interfaces or links being accounted for at each level.

As will be appreciated, in this multi-step iterative process one looks at the complexity of each object and then generates certain state-to-state diagrams, case diagrams, activity diagrams, and sequence diagrams for each object at each level.

Then depending upon the complexity of an object, one can decompose it to another level, using another set of diagrams for the next lower level objects.

With each level having objects, one continues the decomposition to the point at which one can hand off the object to a design engineer to design the circuit or software that goes along with the object.

The important characteristic concerning objects is that objects provide a better form of communication between systems engineers and the other-disciplined engineers.

It will be appreciated that an object, at least in the theoretical sense, is an instantiation of a class where the class defines the properties, the operations, and the data contained in the object.

From a more practical form, an object allows one to develop functionally what the particular piece of equipment or software is supposed to do. In short, the object is the way in which one describes how certain things are to be performed.

Note that for each object a function or functions are provided for the object so that, for instance, one could assign a communications function to a specific object, for instance, a radio object. In the above-noted scenario of firefighting, one could have another object such as a water drop system and one would assign to the water drop system, for instance, the ability to collect water and to open doors and to drop water at a specific target location.

Thus, one can have a large number of requirements and assign them to specific objects that are going to perform the particular function.

What is done in the systems engineering format is to develop requirements and assign those requirements to an object. The systems engineer then takes those requirements and actually architect the system and assign objects to the requirements.

When a systems engineer assigns requirements to objects, he does that in a specific way. Each object has a so-called "use case," which describes a scenario or a goal and preferably a function that the object must perform. Thus if, for instance, one performs the steps within a given use case, one will actually achieve the object of that use case.

Aside from defining use cases, objects have other characteristics. For instance, the values that the objects hold corresponds to the data associated with the object. Objects also have interfaces that permit them to communicate with other objects.

One advantage of using objects is called "encapsulation," which allows one to take functions and organize them into a specific object. Thus, anytime that one needs a function, one can know how to communicate with that object to get the function performed. Encapsulation allows one to group functions by object and optimize the amount of communication. It will be appreciated that the less the communication between the objects, the more efficient is the system. Thus, use of objects allows one to optimize the particular architecture.

In the subject system, by organizing functions into objects, taking advantage of encapsulation techniques, one minimizes the amount of communications and optimizes the architecture of the entire system. The optimization of communications and efficiency at which the system runs is called "maximum cohesion," which in turn correlates to "minimum coupling."

Having described object-oriented processes, it is the salient feature of the subject invention to utilize object-oriented thinking in functional decomposition.

The result of this multi-level hierarchical functional decomposition with object-oriented techniques at each level permits one to understand the entire system through small sections or segments so that one can understand a portion of the design and get a handle on it.

It has been said that a typical person can keep track of 7 to 9 things at any given time. Thus, to minimize the amount of complexity in a system, one provides object-oriented techniques that operate at a given level in which the objects permit the engineer to keep track of a reasonable number of things; and then provide the ability to communicate between various levels.

Specifically and as an example, one might have nine levels in a functional object decomposition. At any given level one might have 3 to 100 objects. This, however, may be somewhat complex. But if one needs to understand the system from an overall view, one can examine a particular level and look at the system functions of the objects in this level. Thus, for instance, there may be nine or ten objects in a level and one can understand the operation of the system more easily by breaking or decomposing the system into levels containing objects.

Another feature of the subject invention is that one can get a handle on the entire system by looking down a level and looking at the object-oriented designs that go on within that level so that one can get a detailed understanding of what is going on at that level.

Another key feature of the subject invention is complete traceability through the hierarchical levels. What this means is that one first creates a model. One then provides "links" between all of the objects. The one establishes links between the levels. This means that links are provided from one level down to the next level, as well as between all objects within a given level, with the links establishing the communication.

It will be noted that links are part of the meta-tool that is used as a design tool in which the design tool has a meta-model that supports object linking. The links establish that, for instance, a given object is related to another object through a particular interface defined by the links. The links are provided at each object level and between the levels by the systems engineer.

As the systems engineer follows the subject methodology, he puts in links as he is decomposing the system. Thus, part of the object-oriented engineering at each level is to put in the links between the various objects. By putting in the links, one has instant traceability at all levels to all other levels of the system that is being designed. This is useful so that one can understand how objects at one level affect objects on another level and vice versa.

UML

In one embodiment, UML, the Uniform Modeling Language for objects, is used to create objects on the same level. A typical example of a simple system is the architecting of an ATM machine, which may have 10 or 12 objects.

However, in complex systems, one can have, for instance, 40,000 objects and cannot have them occupy the same level. Thus, the system engineer has to have the ability to organize the objects and decompose the system so that engineers can understand what they are designing. It is very important that each engineer understand how what he is working on fits in with the rest of the system.

Note that the Unified Modeling Language was developed by a consortium called the Object Management Group, in which UML has evolved into a language called SystemE1 in which a number of diagrams such as structure diagrams, parametric diagrams and block diagrams are now part of and supported by this profile, which tie back into the main UML body, namely UML, Version 2.0. After the various hierarchical levels of objects are developed one can hand off the model to the software or hardware engineers for development.

The combined approach for system design is referred to as functional object design, which is the combining of both functional decomposition and object-oriented approaches into a hybrid design approach in which the functional object design framework effectively combines the two disciplines in a manner that complements both their capabilities. Note, in one embodiment the subject system utilizes UML and more specifically SYSML for the object-oriented portions of the subject system.

In summary, an architecture for designing complex systems includes combining functional decomposition and object-oriented techniques at each level along with specifying links between the levels as well as links between the objects at a level to promote understanding of the system under development and assist both the system design engineer and the hardware and software engineer to develop the system.

BRIEF DESCRIPTION OF THE DRAWINGS

These and other features of the subject invention will be better understood in connection with the Detailed Description, in conjunction with the Drawings, of which.

DETAILED DESCRIPTION

In terms of notation to support the implementation of the functional object-oriented design framework, the Unified Modeling Language (UML) and its system-based variant SYSML are used due to UML's status as the de-facto standard for object-oriented development. In one embodiment, the subject functional object design methodology relies heavily on UML with some extensions that are specific to the specific development tool being used. Even though some of the notations used are closely aligned with the selected development tool, in nearly all cases there are alternate representations that can be achieved using purely UML or SYSML constructs.

Figure 1:
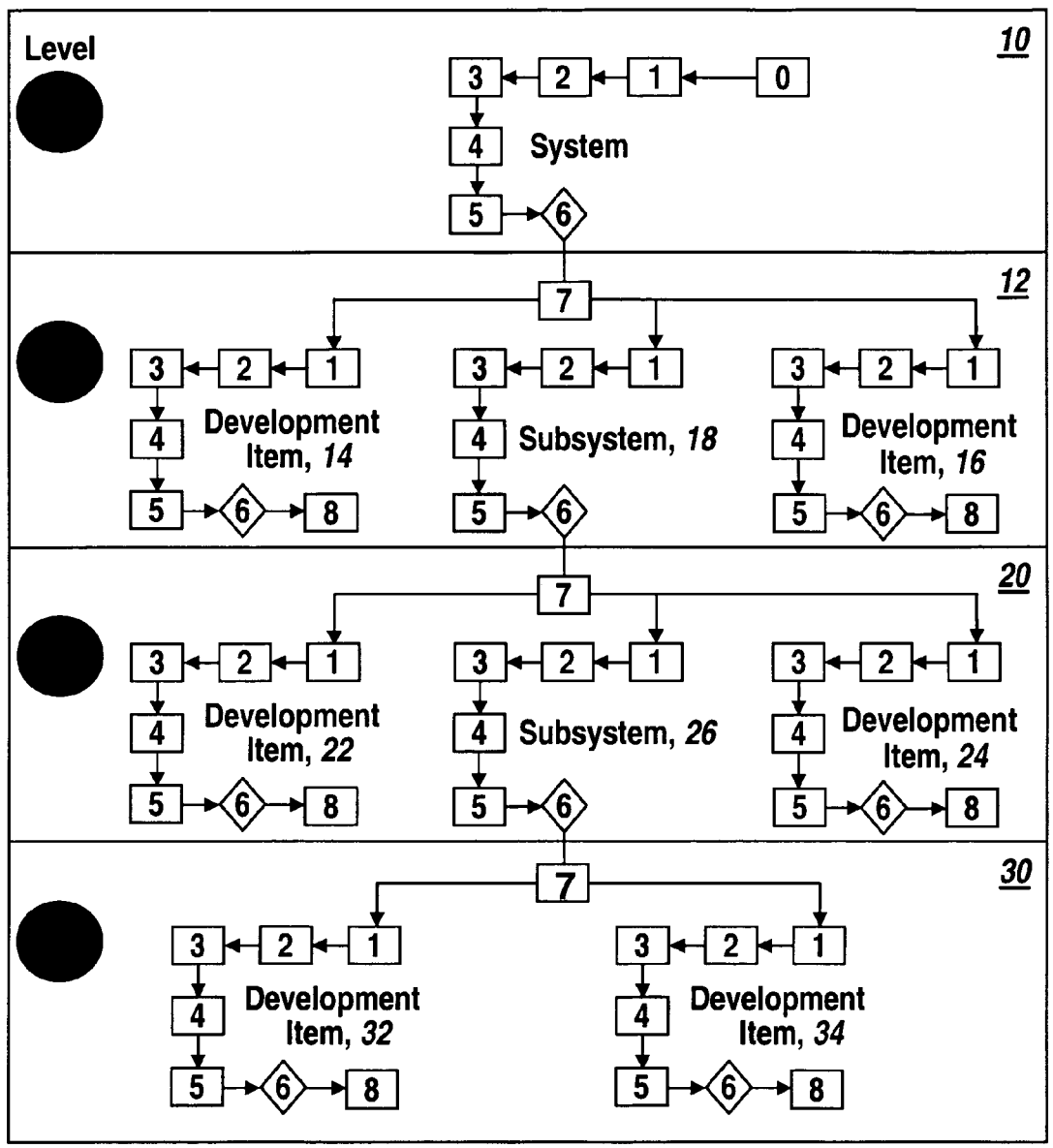
FIG. 1 is a schematic drawing showing a synopsis of the FOD Iterative Methodology of the present invention.

Referring now to FIG. 1, this figure depicts the development of a hypothetical system by iteratively using the functional object design steps documented above.

In FIG. 1, Level 0, shown at 10, is the "System" or top-level of the development. As the FOD steps are performed at this level, the objects at the next level 12, in this case Level 1, become defined. Two of three items at Level 1 are separately implementable by a development team 14 and 16, but one of the items, for instance subsystem 18, is more complex and requires additional decomposition. At the next level 20, the same scenario continues to apply as the system's components are defined in more detail. Here subsystem 18 results in two development items 22 and 24, which need no further decomposition. These tasks can be handed off to engineering for implementation because they are sufficiently designed. However, another subsystem 26 needs further design and is decomposed at level 30 into two final development items 32 and 34. Thus, at Level 3 the items are sufficiently well defined for hand-off to a specific discipline.

Figure 2:
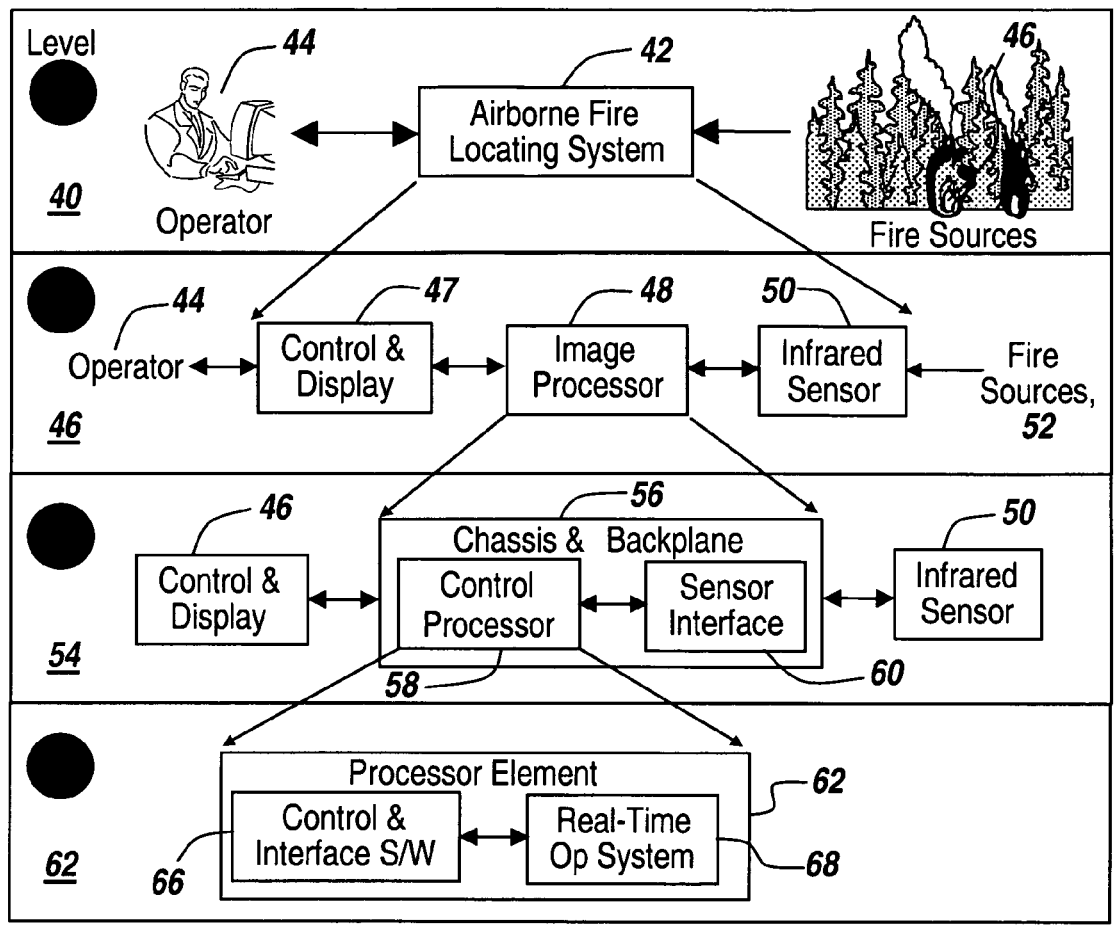
FIG. 2 is a schematic drawing showing an example system decomposition applying the FOD methodology of the present invention.

An example system is now presented for visualizing how the above steps are used at a very high level of abstraction to define a useful system. In the following example, a system is developed to aid in the detection of wild fires over a very large area. The system uses infrared sensors that are mounted on an aircraft and are used to detected possible fires. The system is to be operated by a spotter flying in the aircraft along with a pilot to help pinpoint unexplained areas of heat and determine if they represent a danger. FIG. 2 shows a possible decomposition of this hypothetical system.

The above information establishes a top-level view of the methodology, so that the following details can be presented in the proper context.

Step 0

Scoping Out the New System

In the first step 40 of the methodology, the critical characteristics of the system need to be captured for later development use. The general object of locating a fire and using observations is shown in box 42. This usually involves a fair amount of research into the background and needs of a to-be-developed product or system. The attributes of a new system can come in many forms including: objectives, features, needs, capabilities, requirements, interfaces to new and existing systems, compliance with new or existing standards and operability in new and/or existing environments. A predecessor system, if any, is typically an excellent point of reference for this activity because it is the one to be replaced by the system to be developed. Once the overall attributes of the system to be developed have been captured in single controlled and documented set, the stage is set to proceed to the first step in the system design methodology.

As can be seen from FIG. 2, what is depicted is a complex system involving airborne fire locating in which an operator 44 is used to spot fire sources 46 in the ground terrain. Thus the airborne fire locating system constitutes an object.

However, the object is required to be decomposed at least at another level, here shown at 46 to include operator 44, control and display object 47, image processor object 48 and infrared sensor 50, with fire resources 52 being available to infrared sensor 50 as illustrated.

Here it can be seen that the image processor object 48 is complex and requires yet another level of sophistication. What can be seen is that at level 54 the image processor object is decomposed into a chassis and backbone object 56, which includes a control processor 58 and a sensor interface 60. Control and display object 47 is coupled to object 56, whereas infrared sensor 50 is also coupled thereto.

Note the control and display in Level 2, here illustrated at level 54, is of sufficient definition, as is infrared sensor 50, so that they are ready to be implemented by engineering at this point.

However, the chassis and backbone object 56 is complex and requires another level as illustrated at 62 such that control processor 50 is decomposed into a processor element 64, which includes control and interface software 66 and a real-time operating system 68.

What can be seen is that the original object of an airborne fire location system has been decomposed into a number of levels, with there being communication between the levels and with several objects in the various levels being decomposed into a further level with objects therein.

Step 1

Identifying the Object Context and Interfaces

Figure 3:
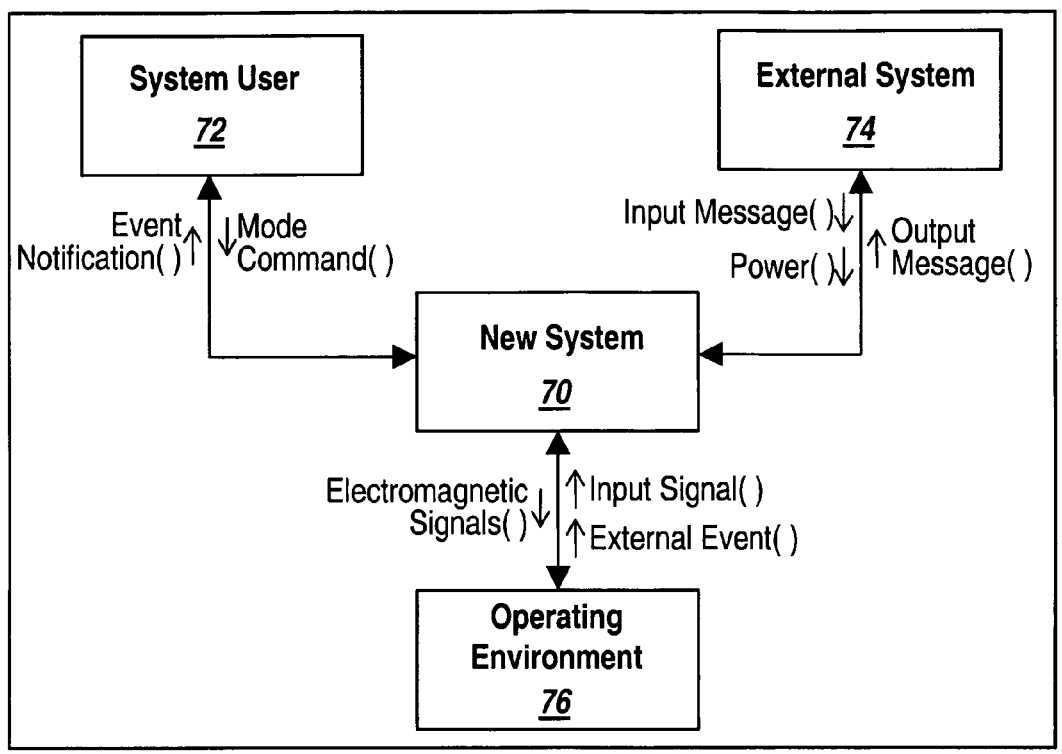
FIG. 3 is a schematic drawing showing an example system context diagram.

FIG. 3 is a system architecture diagram called a context diagram in which interfaces with a system user on external system and an operating environment are depicted. This diagram functions as a context manager and is arguably the keystone diagram for the overall system since it defines the boundary and scope of the system to be designed and what other entities the system interacts with. Here the new system is depicted at 70 in which a system user 72 communications with the new system 70 with transmission of mode commands and event notification.

In many cases, the distinction between what is "inside" the system and what is "outside" the system is clear, but in many cases it is not. It is important to document where an external system 74 is coupled to the new system 70 to provide power and input messages to the new system and where output messages are routed. Here, new system 70 is coupled to the operating environment 76 using electromagnetic signaling and with input signals and external events communicated to new system 70. One useful rule of thumb for deciding "what is in and what is out" is to answer the question: "What am I or my organization responsible for developing?" The context diagram example discussed hereafter shows the "New System" along with the other entities it is required to interact or interface with. Many times system developers forget to include the environment in which the system must operate as one of the key entities. Sometimes this is not significant, but more often than not it ends up being of critical importance.

In this simple example, the context diagram also shows the interactions between the New System and the other entities, but in most cases, one or more separate diagrams for each external entity are needed in order to convey the necessary information fully.

The first iteration through this step at the system level is usually much harder than when this step is repeated for most lower levels within the system. This is because the external interfaces that apply to those objects as well as the internal interface that applies to these objects are initially defined as part of another methodology step. More details about this lower level interface derivation are described hereinafter.

Step 2

Defining the Object Capabilities and Constraints

Figure 4:
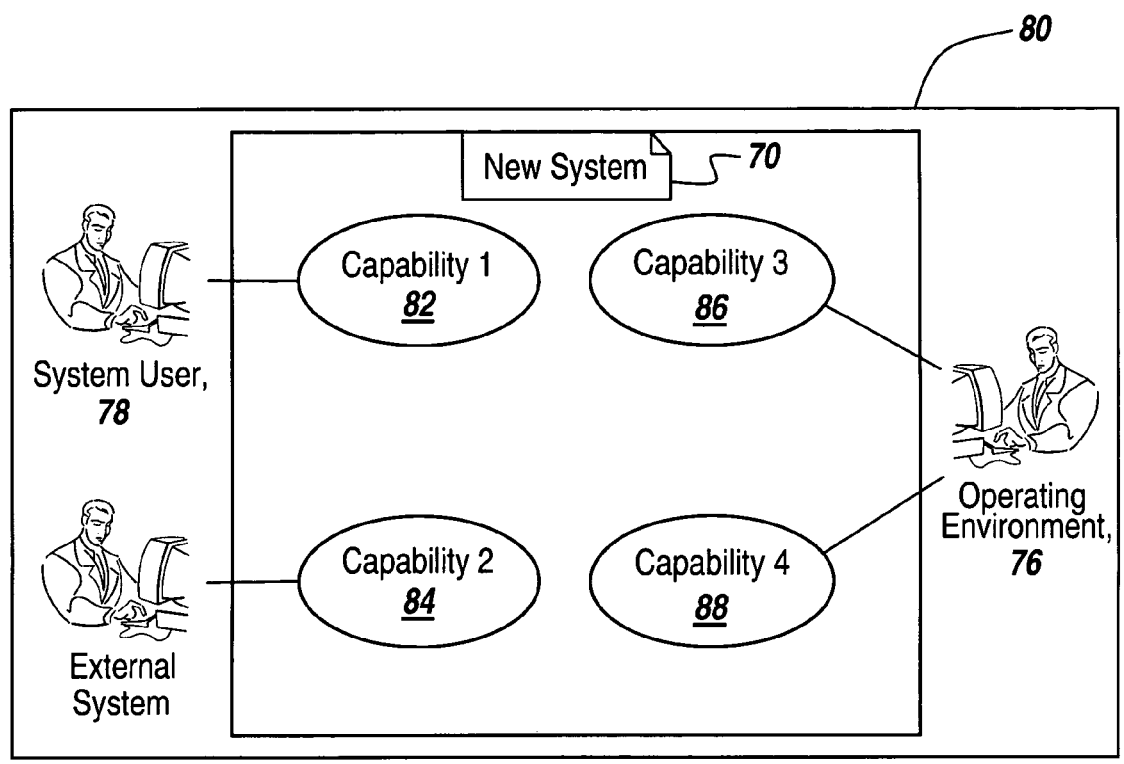
FIG. 4 is a schematic drawing showing an example system use case diagram.

Also of critical importance is "what does the system do?" which is represented by the top-level use case diagram 80 in FIG. 4. FIG. 4 is a case diagram with the use cases in ovals, and with use cases assigned to an object. In the case of FIG. 4, the "boundary" is the New System 70 and the use cases are the behavior that the system must support having capabilities 82-88. Most developers familiar with UML realize that FIG. 4 is just the "tip of the iceberg" when identifying behavior. Besides the use case's name and relationship to actors, it usually has additional properties such as: Motivation, Description, Pre-Conditions and Post-Conditions plus optional information such as Alternate Courses, i.e., what happens when something unexpected happens; and Assumptions and Boundary, all defining the New System. Clearly showing the behavior associated with a given system may require many use case diagrams depicting functionally related use cases.

In subsequent iterations of Step 2, the use cases apply to the lower level objects instead of the system level to define the functional behavior of those lower level objects. The use cases associated with the lower level objects are easily extracted from subsequent steps in the methodology. This lower level use case derivation is described in more detail hereinafter.

For each use case defined for the object, what is needed is a realization of that use case using the system and the external actors that the system interacts with. Although the use case diagram typically shows only the actor that initiates the behavior, the sequence or collaboration diagram that realizes the use case needs to show both the initiating and involved actors.

Figure 5:
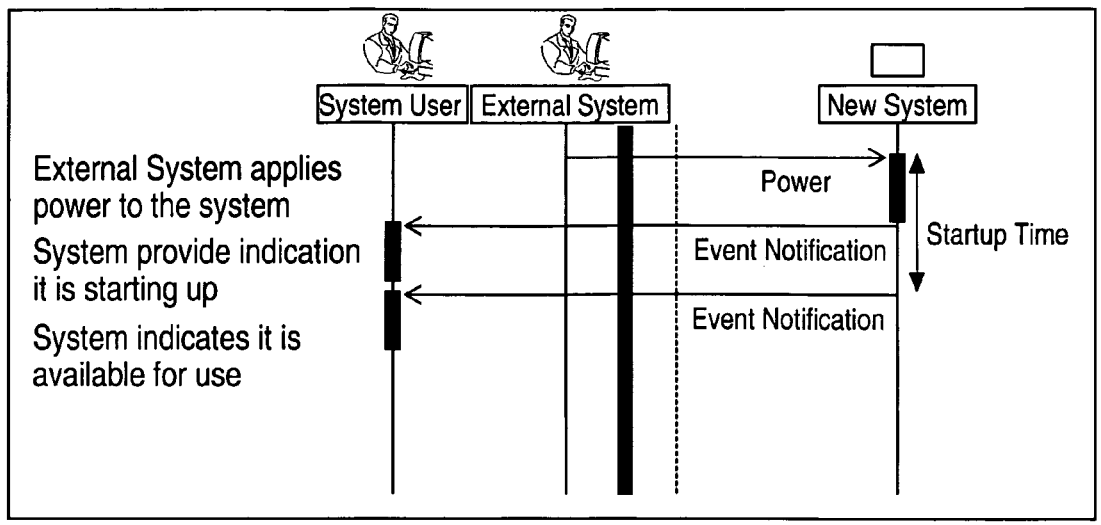
FIG. 5 is a schematic drawing showing an example use case realization using a sequence diagram.

FIG. 5 shows a sample sequence diagram for implementation of a previously defined use case. This diagram shows how the use case is sequentially performed, with the objects accomplishing the steps within a use case. Here the system user is going to start up the system and provide an indication that the system is ready for use.

Figure 6:
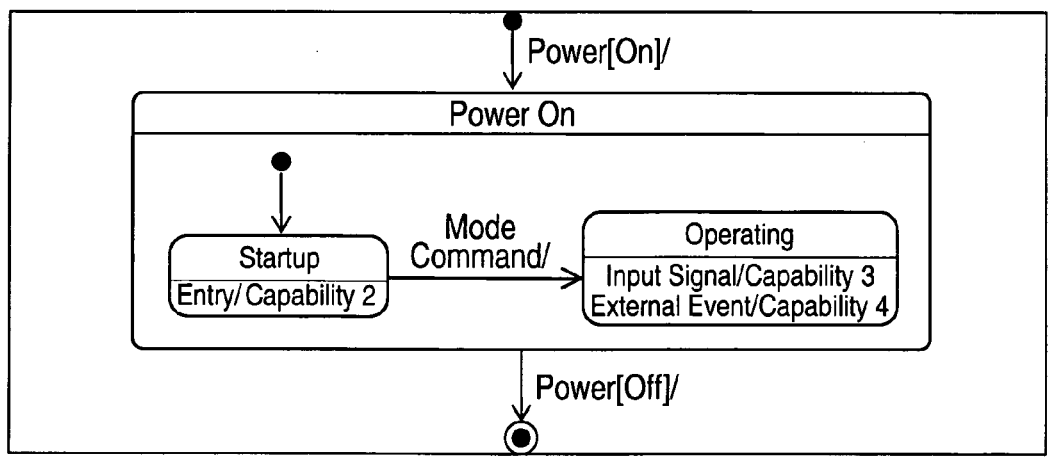
FIG. 6 is a schematic drawing showing an example state transition diagram showing use cases.

In addition to defining and realizing the behavior of the object, this step is also the time to be identifying the objects states and modes. What is needed is a state transition diagram such as depicted in FIG. 6. As an example, after the power-on state the system performs the use case called Capability 2. Then upon command the system is going to transition to the operating state to perform Capability 3 and Capability 4, depending on the input signals.

In the subject methodology, it is not sufficient to simply identify the states of an object and the transitions between the states. What defines a state is the capabilities the object can support while in it. Therefore the state diagram needs to show how the object's state is defined in terms of the capabilities supported in that state. FIG. 6 provides a view of the example object's defined states defined in terms of the object's use cases. In some cases, it may be necessary to revisit the use case definitions in order to provide a clean separation between the uses cases and the states they define. All use cases that are directly initiated by external actors, and the events that initiate them need to be represented in the state diagram. Note that the state diagram of FIG. 6 is faulty in that one of the use cases defined for the object is missing.

Figure 7:
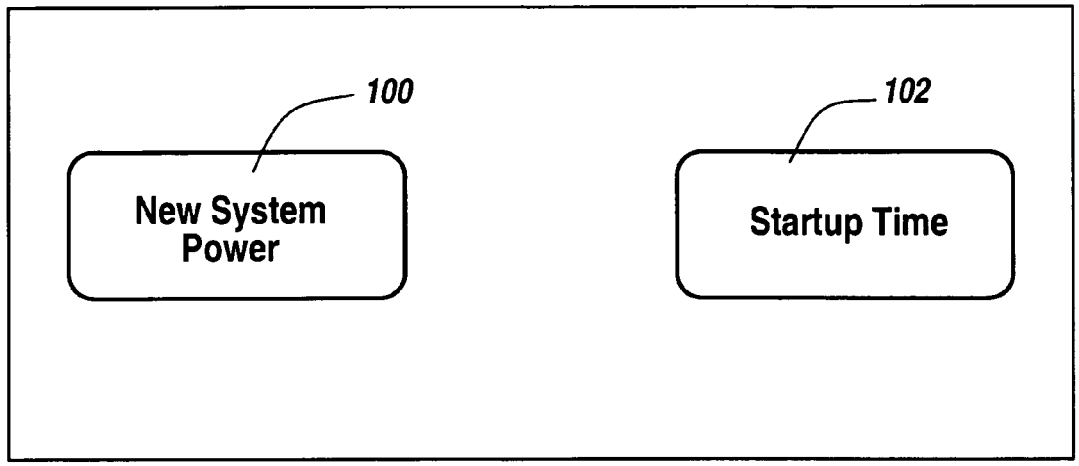
FIG. 7 is a schematic drawing showing an example constraint diagram.

In addition to the functional requirements of a system, the non-functional and time performance aspects are usually a significant consideration. This step is crucial to support correct allocation of these constraints as the object is decomposed into sub-objects. FIG. 7 shows an example set of constraints for a system level object and is called a constraint diagram. Here this constraint diagram specifies how much power 100 is available that the system must start up in a certain amount of time 102.

Step 3

Establishing Traceability

Figure 8:
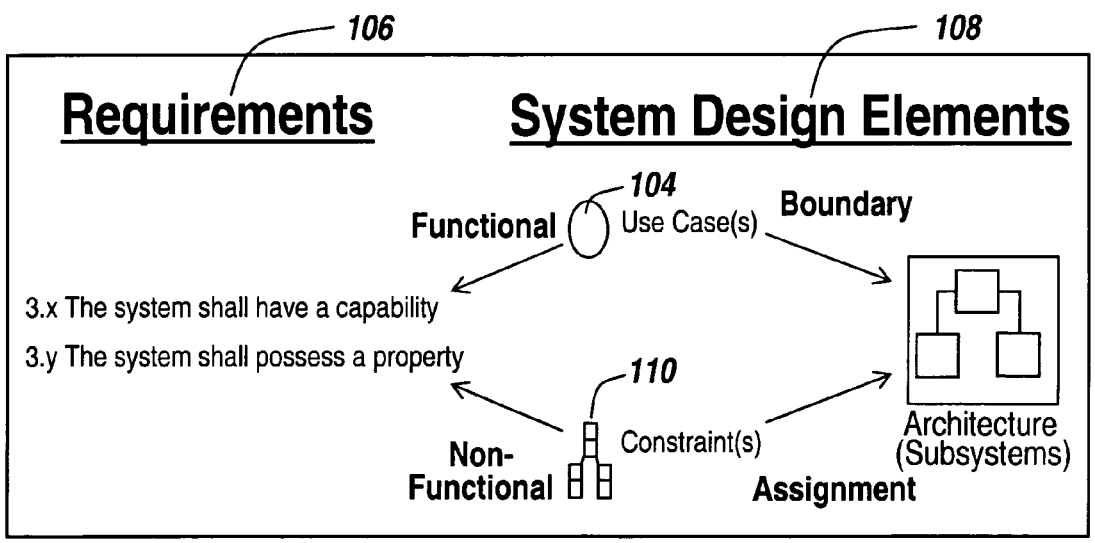
FIG. 8 is a schematic drawing showing a tracing requirement to system design artifacts.

Once the object's functional capabilities, states and constraints have been defined, it is necessary to trace these design artifacts back to the requirements that originated them. Some developers may deride this exercise as academic, but experiences in the design and development have shown this to be absolutely essential. Without this step, it is surprisingly easy to misunderstand or completely miss state requirements or to have defined capability that is not supported by the originally stated needs. A phenomenon known as "gold-plating", that uses traceability, is used to identify the above problems. To do so, gold-plating techniques include inserting requirements for "derived" functionality back into the original requirements for the object to "test" whether the capability is actually needed. If the capability is important enough to be in the system, it needs to be documented as a requirement. FIG. 8 is a bi-directional relationship diagram that depicts the traceability between different types of requirements and their corresponding development artifacts. Having automated tools to define these traceability links makes the process of automating them much easier. Here use cases 104 are traced back functionally to requirements 106 and forward via boundaries to system design element 108. Likewise, constraints 110 are non-functionally linked to the requirements 106 and via assignment links to system design elements.

Step 4

Developing the Next Level Objects

The process of decomposing the existing object into a number of sub-objects is the most crucial of the six iterative steps because a significant misstep here can lead to a flawed or compromised system architecture. Depending on the complexity of the system and the object being decomposed, the process can range from simple and straightforward to arduous and complex. Some analysis of alternatives is usually called for in order to provide the "best" decomposition of the objects at the next level. Many times the sub-steps in this step of the development process have to be iterated several times with intermediate refinements before a suitable set of sub-objects and their relationships are defined.

Figure 9:
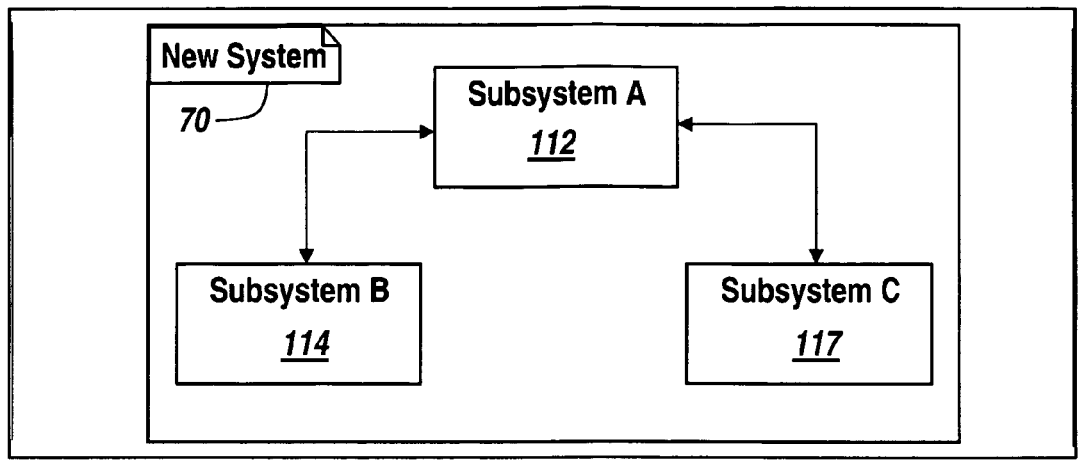
FIG. 9 is a schematic drawing showing an example of object decomposition into sub-objects.

Part of step 4 is to identify the sub-objects that make up the object currently being developed at the current level. FIG. 9 shows an example decomposition of the example system 70 into interrelated sub-objects or subsystems 112, 114 and 116. This in essence shows how the new system interfaces with all the other systems. In this particular example, the specific interactions of the sub-objects are not explicitly shown.

Figure 10:
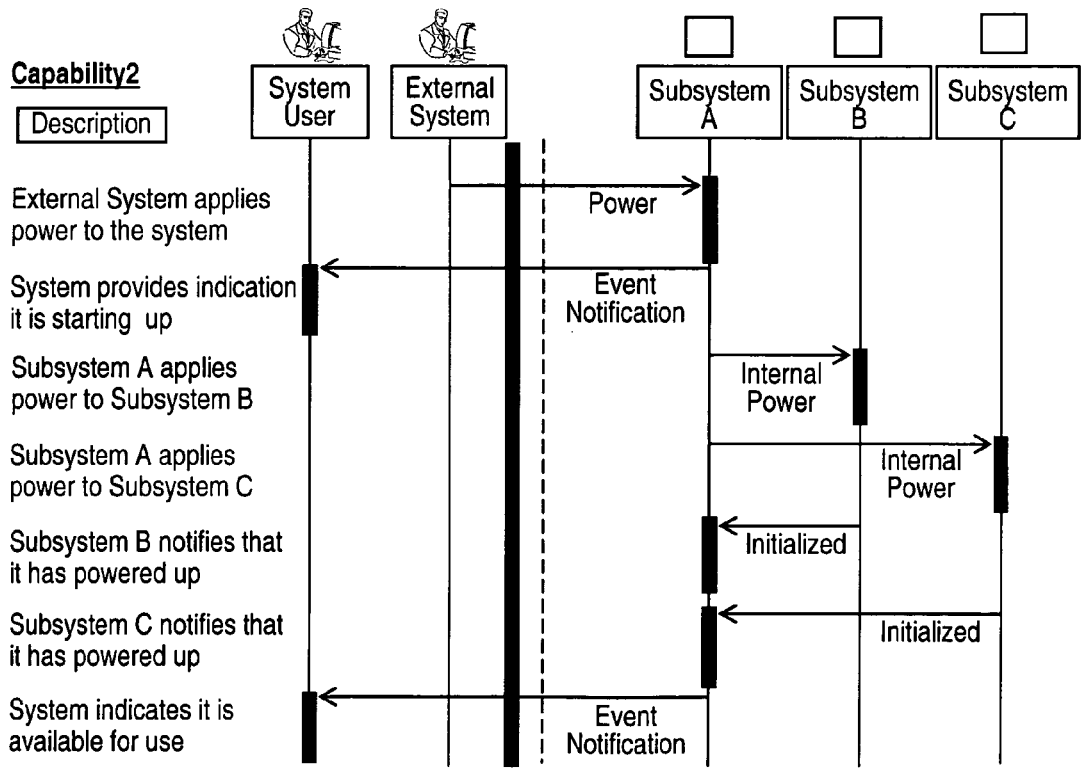
FIG. 10 is a schematic drawing showing an example of use case realization using sub-objects.

The other part of step 4 is to take each use case identified for the object, the "New System" 70 in the FIG. 9 example, and create a realization of that use case based on the sub-objects instead of the object itself. Using the sub-objects instead of the object itself to construct these sequences forces the developers to:
 1. Make explicit assignments of functionality between the sub-objects
 2. Define the relationships between the sub-objects necessary to support the functionality
 3. Specifically allocate performance requirements among the sub-objects FIG. 10 is a sequence diagram that provides an example sequence for the same use case as the sequence in FIG. 5 except that sub-objects are used instead of the object itself. It is not unusual to discover some new derived requirements and/or interfaces for the object during the development of these lower-level sequence diagrams for the use cases.

As alluded to in the Step 2 description, the lower level sequence diagram feeds directly into the development of Steps 1 and 2 for each of the sub-objects. The events between external actors and internal sub-objects form the basis of the context for that sub-object when it is decomposed as part of its own execution of the subject methodology steps. Each time that a sub-object receives an event in this sequence, it also must support a functional behavior from that particular sub-object. Therefore, these functional behaviors form the basis of the use cases for that sub-object when it is decomposed as part of its own execution using the subject FOD methodology steps.

Figure 11:
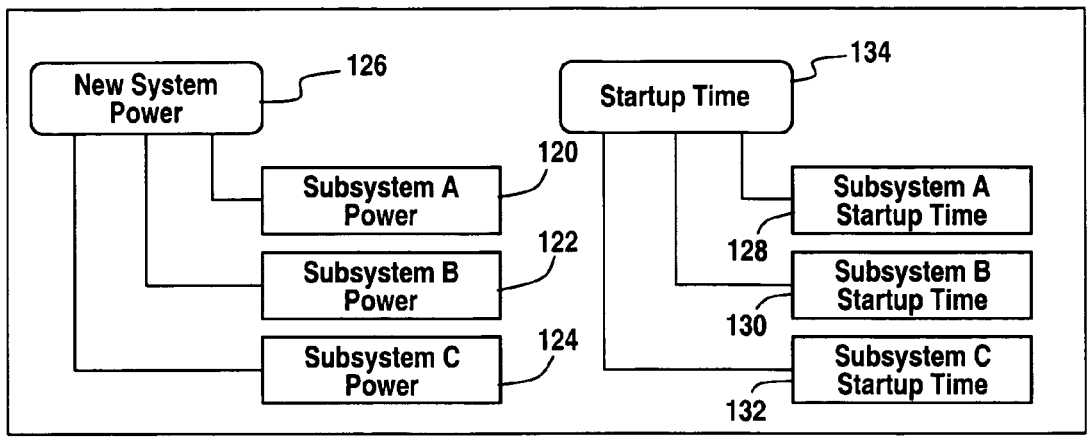
FIG. 11 is a schematic drawing showing an example of allocations of non-functional requirements.

Another critical aspect of Step 4 that touches on in the sequence diagram is the allocation of the constraints to the subsystems, where the constraints include physical or non-functional requirements. FIG. 11 depicts an allocation of the system-level constraints for each subsystem, which must be accompanied by specific values during this step. Here with power as a constant, the subsystem power constraints 120, 122 and 124, contribute to new subsystem power constraint 126. Also, startup time constraints for subsystems 128, 130 and 132 contribute to startup time constraint 134.

Step 5

Capturing Sub-Object Capabilities and Constraints

Once the artifacts of Step 4 have been stabilized, it is necessary to capture the functional requirements, and constraints associated with that sub-object to support either the item development or next level of system decomposition. For maintainability and configuration control purposes, it is preferable to document the requirements for each sub-object separately. It is also a good practice to trace the sub-object requirements to the parent object requirements from which they originated.

Step 6

Deciding which Sub-Objects Need Further Decomposition

At this point, the decision needs to be made whether to decompose a given sub-object further or to hand it off to a development group for further design and implementation. This is not always a straightforward decision, but if there is any doubt, then a new cycle of FOD steps for the sub-object should be undertaken. Often, the need for further decomposition might not be able to be determined until Step 4 of the next cycle of FOD steps.

Step 7

The Next Iteration

Figure 12:
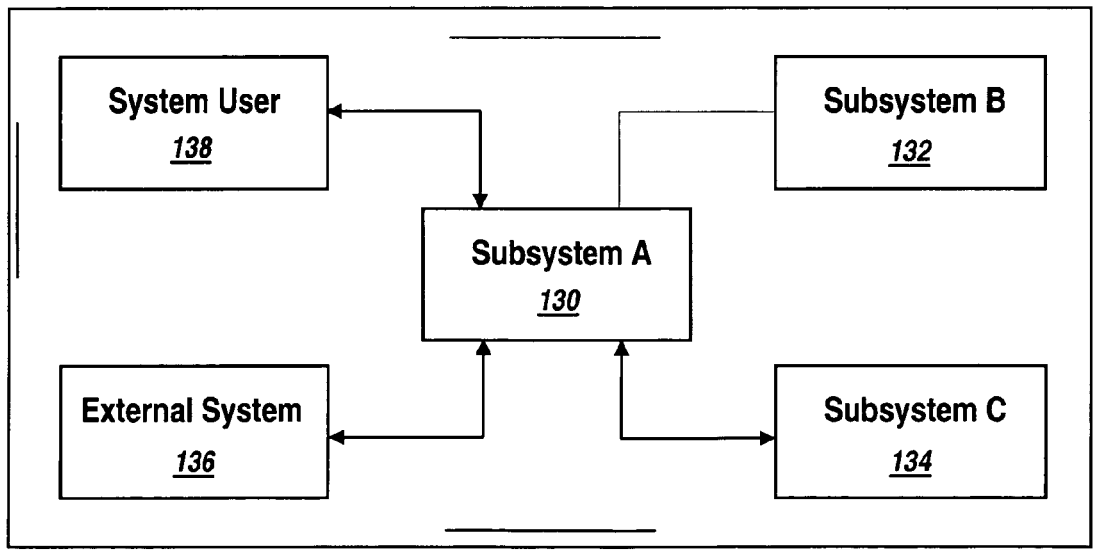
FIG. 12 is a schematic drawing showing an example of second level context diagram.

In subsequent iterations of the FOD steps, the sub-objects from the previous steps requiring further decomposition each become the primary object in a related, but largely independent development effort. Unlike the first cycle when the system was the primary object, there are a large number of system design artifacts to base subsequent development upon. As shown in FIG. 12, the context and interfaces for Subsystem A at 130 are derived from the work of the previous cycle and result in a diagram such as the one shown. Similarly, the use case diagram and sequence diagrams can be called upon from previous subsystems 132 and 134, from an external system 136 or from the system user 138.

Step 8

Implementation of Sub-Objects that Need No Further Decomposition

For each discipline there is a specific implementation method that must be carried out for those objects that do not need further decomposition. For electrical, it could be the implementation of the specific circuit object whose detail was created using the FOD methodology. For mechanical, it could be the implementation of the structural design object detail that was created with FOD. For software, it could be the coding of the architecture and implementation of the objects created through the use of FOD. Each discipline will have its own method of implementing the objects derived with FOD.

Consistency of System Design Artifacts

Figure 13:
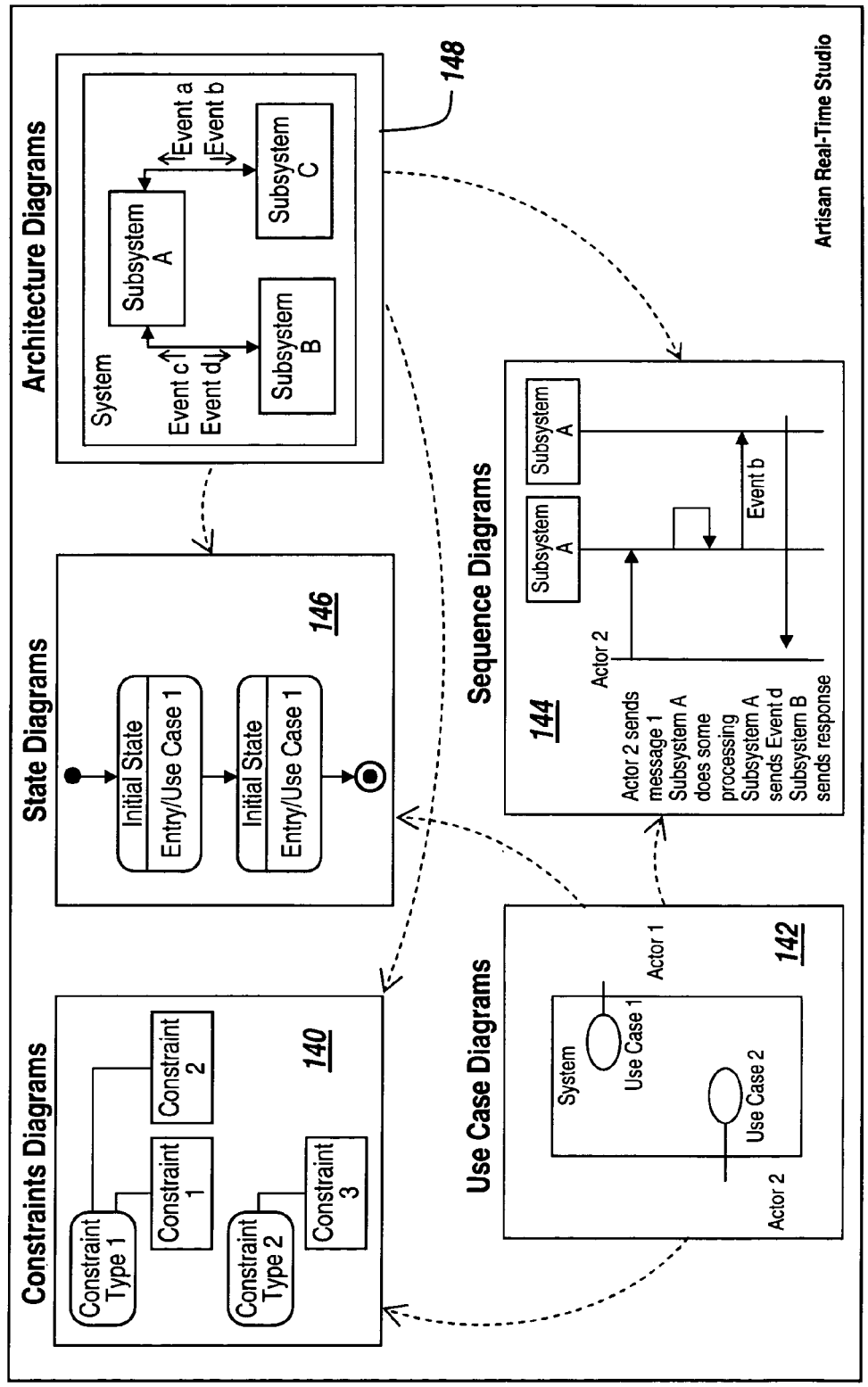
FIG. 13 is a schematic drawing showing a top-level consistency of system design artifacts.

FIG. 13 shows all of the relationships between all previous diagrams. Here, the constraint diagrams 140 are tied to use case diagrams 142, in turn tied to sequence diagrams 144, tied in turn to state diagrams 146, in turn tied to architectural diagrams 148. At each given level and for each object, the FOD methodology results in a consistent set of system design artifacts. For each object, there is a set of use cases that define that object's functional behavior and there is a set of constraints to define that object's non-functional behavior. For each object there is also a single state transition diagram that incorporates all of the externally initiated use cases defined for that object. For each object there is also a set of sub-objects that define its structure or architecture of the object. Finally, the set of sub-objects and their interfaces support the realization of the primary object's use cases.

In summary, the subject functional object-oriented design methodology provides a useful integration of functional and object-oriented design approaches to support development of complex systems. Because it is an iterative methodology that is consistent from level to level, it is relatively straightforward for the system designers to learn and apply. Most aspects of the methodology can also be implemented using UML-based development tools. Although originated for use in complex systems, those skilled in the art will appreciate that the subject methodology is easily scalable to other developments as well.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for generating a specification for a complex project, comprising the step of:
   generating the specification through the use of combined object-oriented programming and functional decomposition techniques, such that for each level of system development object and sub-object creation are specified using the following steps:
   a. establishing object requirements;
   b. identifying object context and interfaces;
   c. defining object capabilities and constraints;

d. establishing traceability between the object requirements and its capabilities and constraints;
e. developing a realization of the object by decomposing it into sub-objects;
f. assigning capabilities and constraints to the new sub-objects;
g. deciding which sub-objects to decompose further;
h. repeating steps a through g for each sub-object which requires further decomposition in which the sub-object now becomes the new object; and,
i. using discipline-specific methods to implement sub-objects that do not need further decomposition, whereby a consistent design methodology is provided for architecting complex systems.

2. The method of claim 1, wherein said method includes an iterative top-down development methodology in which numbers of levels exist, with object-oriented programming being applied at each level of decomposition.

3. The method of claim 1, wherein the complex system design includes hierarchical levels and wherein object-oriented analysis and design techniques are used at each individual hierarchical level.

4. The method of claim 3, wherein each hierarchical level is a hierarchical composition level, and wherein the composition to each level is accomplished utilizing techniques in which one applies, in a certain order, what things are to be accomplished and what the methodology is.

5. The method of claim 1, wherein the methodology incorporates a multi-step process in which one addresses the objects one wants to create, looks at the environment in which the objects are to operate, and looks to how the objects communicate with each other.

6. The method of claim 5, and further including generating at least one of state-to-state diagrams, case diagrams, activity diagrams, and sequence diagrams for each object at each level.

7. The method of claim 1, and further including the step of decomposing an object from one level to another.

8. The method of claim 7, wherein the decomposing step includes utilizing another set of diagrams for the next lower level objects.

9. The method of claim 7, wherein with each level having objects, the decomposition continues to the point at which one need not decompose an object at a level any further, whereby the decomposition allows a designer to design the circuit or software associated with the fully decomposed object.

10. The method of claim 1, wherein for each object a communications function is assigned.

11. The method of claim 10, wherein the communications function assigned to an object depends upon the specific object function.

12. The method of claim 1, wherein each of the objects has a requirement assigned to it, the requirement including a use case that describes a scenario, goal or function that the object must perform.

13. The method of claim 12, wherein the value that an objects holds includes data associated with the object.

14. The method of claim 1, wherein the objects have interfaces that permit them to communicate with other objects.

15. The method of claim 14, wherein the objects are grouped by function to optimize the amount of communication required between the objects, thus to encapsulate objects by group function.

16. The method of claim 14, wherein the objects are grouped for maximum cohesion corresponding to minimum coupling.

17. The method of claim 1, wherein communication between the levels permits traceability, the communication establishing a link between levels as well as links between objects within a level.

18. The method of claim 1, wherein objects are created utilizing the Unified Modeling Language.

19. The method of claim 18, wherein the modeling language includes SYSML.

* * * * *